US007486196B1

(12) United States Patent
Bicheno et al.

(10) Patent No.: US 7,486,196 B1
(45) Date of Patent: Feb. 3, 2009

(54) USING AUDIO TO DETECT CHANGES TO THE PERFORMANCE OF AN APPLICATION

(75) Inventors: Richard M. Bicheno, Hants (GB); Tim Dunn, Warnford (GB); Ian P. Hurworth, Eastleigh (GB); Xiaoming Zhang, Hants (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/102,533

(22) Filed: Apr. 14, 2008

(51) Int. Cl.
*G08B 5/00* (2006.01)

(52) U.S. Cl. .................... 340/691.3; 340/328; 340/514; 340/384.1; 709/207; 709/224; 714/47; 714/E11.18; 714/E11.192; 717/127

(58) Field of Classification Search ............. 340/691.3, 340/328, 7.49–7.62, 384.1–384.7, 514; 714/47, 714/E11.18, E11.192; 717/127; 709/207, 709/224; 702/38–54, 75, 108, 171–185
See application file for complete search history.

(56) References Cited

U.S. PATENT DOCUMENTS

| 4,713,669 | A | 12/1987 | Shuch |
| 4,777,474 | A | 10/1988 | Clayton |
| 5,293,385 | A | 3/1994 | Hary |
| 5,375,199 | A | 12/1994 | Harrow et al. |
| 5,946,666 | A | 8/1999 | Nevo et al. |
| 6,192,490 | B1 * | 2/2001 | Gross ........................... 714/47 |
| 6,446,123 | B1 | 9/2002 | Ballantine et al. |
| 6,801,940 | B1 * | 10/2004 | Moran et al. ................. 709/224 |
| 7,197,428 | B1 | 3/2007 | Saghier et al. |
| 7,409,430 | B2 * | 8/2008 | Leukert-Knapp et al. ... 709/207 |
| 2002/0147966 | A1 | 10/2002 | Frazier |
| 2003/0212646 | A1 | 11/2003 | Horvitz |
| 2003/0229406 | A1 | 12/2003 | Maity |
| 2004/0064552 | A1 * | 4/2004 | Chong et al. ................. 709/224 |
| 2004/0122940 | A1 * | 6/2004 | Gibson et al. ............... 709/224 |
| 2004/0267826 | A1 | 12/2004 | Garding et al. |
| 2005/0193376 | A1 | 9/2005 | Harrison |

OTHER PUBLICATIONS

*Informationweek*, n679, pp. 8A-22A, Apr. 27, 1998, Fournier, Roger.

(Continued)

*Primary Examiner*—Brent Swarthout
(74) *Attorney, Agent, or Firm*—Oppenheimer Wolff & Donnelly LLP; Adam P. Kiedrowski

(57) ABSTRACT

A method for monitoring the performance of an application comprises determining an output of an application that requires monitoring, assigning an audible sound to the output, running the application and allowing the application to reach a state of equilibrium, determining a baseline for the output when the application is in the state of equilibrium, monitoring the output to detect a change relative to the baseline, emitting the audible sound assigned to the output when the detected change varies from the baseline by a predetermined amount, and adjusting configurable parameters of the audible sound to indicate the existence of the detected change, the magnitude of the detected change relative to the baseline, and the degree of deviation from the baseline. The amplitude of the audible sound may be adjusted to indicate the magnitude of the detected change from the baseline, and the pitch of the audible sound may be adjusted to indicate a positive change or a negative change from the baseline.

1 Claim, 1 Drawing Sheet

OTHER PUBLICATIONS

*CommunicationsWeek*, n565, p. 39, Jul. 10, 1995.
A Windows 2000 RAID. (Product Information) http://findarticles.com/p/articles/mi_m0FOX/is_4_5/ai_60805622.
Call Center Roundup. (Buyers Guide) *Teleconnect*, 16, 12, 78(1), Dec. 1998.
AMS-2000 Altitude Alert System (8900) http://www.edmo.com/index.php?module=products&func=display&prod_id=17093.
Audio Emergency Warning Systems http://www.magnalabs.com/audiofacts1.htm.
3-D Audio Traffic Alert and Collision Avoidance System http://human-factors.arc.nasa.gov/ihh/spatial/research/Begault_3d_collision_avoidance.html.
Audio Dementia http://www.audiodementia.com/ad.htm.
"Visual-Aural Representations of Performance for a Scalable application Program" *Scalable High Performance Computing Conference, 1992. SHPCC-92, Proceedings*. Apr. 26-29, 1992; pp. 430-440. Francioni, J.M.; Rover, D.T.

* cited by examiner

USING AUDIO TO DETECT CHANGES TO THE PERFORMANCE OF AN APPLICATION

FIELD OF THE INVENTION

The present invention relates in general to a system and method for monitoring the performance of one or more applications. More particularly, the present invention relates to a system and method for monitoring the performance of an application that includes monitoring a number of outputs and emitting audio sounds according to the magnitude of change of performance.

BACKGROUND OF THE INVENTION

The job of a computer systems analyst or test engineer commonly includes running performance tests to monitor the performance of one or more applications on a computer system. Presently, when running performance tests against an application, it is necessary to measure and monitor multiple outputs. For example, when monitoring a messaging application, the outputs that require monitoring may include, but are not limited to, message throughput rate, memory utilization, CPU utilization, disk utilization, and java heap allocations.

Typically, the monitored outputs have been recorded and viewed in visual (e.g. textual or graphical) form on a computer screen. When monitoring a performance test in real-time it is often difficult to view the results from all of these outputs at once. One reason for this is because different tools, utilities, or applications track each of the outputs, and therefore, the data may be spread across several windows and/or screens. Furthermore, viewing and analyzing the data in real-time requires dedicated attention and screen usage. As a result, the longer a test runs the easier it is to miss an important event. For example, if the message throughput rate declines due to an increase in memory usage, the analyst may notice the change in message throughput rate but not the increase in memory usage unless both windows have his or her full attention. Thus, it becomes apparent that visual monitoring requires 100% cognitive focus. This is inefficient when changes in the state of the performance of an application must be monitored over an extended period of time.

Currently, "dashboard" performance monitoring applications are available that may alert a user to a change by simply sounding an alarm. With these applications, the user must actively switch back to using the monitoring application in order to identify what has changed, and to what extent. Thus, with these "dashboard" monitoring type applications, the user may have missed key points by the time he or she has switched back to the monitoring application. As a result, such monitoring type applications are error prone and unreliable.

Therefore, there is a need for a system and method for testing the performance of one or more applications that enables monitoring to be performed by means other than with a visual display.

BRIEF SUMMARY OF THE INVENTION

The present invention solves the foregoing problems by providing a method for monitoring the performance of an application comprising determining an output of an application that requires monitoring, assigning an audible sound to the output, running the application and allowing the application to reach a state of equilibrium, determining a baseline for the output when the application is in the state of equilibrium, monitoring the output to detect a change relative to the baseline, emitting the audible sound assigned to the output when the detected change varies from the baseline by a predetermined amount, and adjusting configurable parameters of the audible sound to indicate the existence of the detected change, the magnitude of the detected change relative to the baseline, and the degree of deviation from the baseline. The amplitude of the audible sound may be adjusted to indicate the magnitude of the detected change from the baseline, and the pitch of the audible sound may be adjusted to indicate a positive change or a negative change from the baseline.

DETAILED DESCRIPTION OF THE INVENTION

Figure 1:
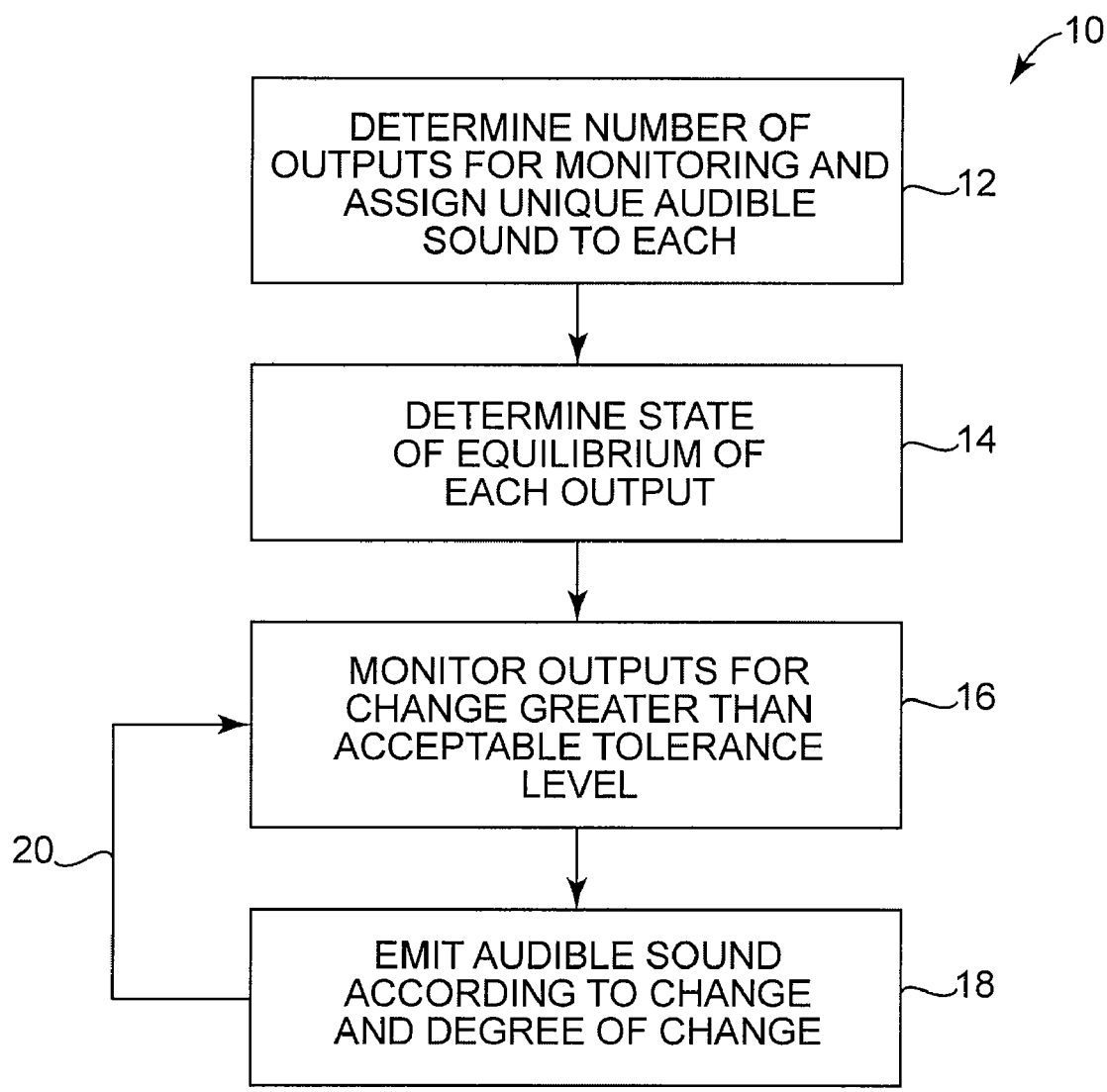
FIG. 1 is a flowchart illustrating one exemplary method of monitoring the performance of an application using audible sounds to represent changes in various outputs related to the performance.

As is well-known to those skilled in the art, a test program may be run on a computer system that monitors various performance outputs for an application and reports changes in performance through a visual display. These performance metrics include, but are not limited to, message throughput rate, memory utilization, CPU utilization, disk utilization, and java heap allocations.

In general, the present invention includes an application performance monitoring system and method that utilizes audible sounds to represent a change in the performance of an application. More particularly, rather than having to view and keep track of numerous outputs during a performance test, the present invention utilizes audible sounds to represent a change in the performance of an application.

As will be discussed in further detail to follow, the system and method of the present invention first assigns each output a unique audible sound. Each output is then monitored against a "baseline," which is determined from a state of equilibrium. If the output varies from the baseline by an amount greater than an accepted tolerance level or variation factor, then one or more audible sounds are emitted signaling the change in performance. The amplitude, pitch, phase, and frequency may be utilized to indicate characteristics of the change, such as the magnitude of the change in performance.

As will be appreciated by those skilled in the art, one advantage of using audio to alert the user to a change in performance is that the user may continue with other work and with a reduced cognitive overhead when there are no changes and the state is in equilibrium. The benefits provided by the present invention increase as the duration of the test increases.

FIG. 1 illustrates one exemplary embodiment of a performance monitoring method 10 in accordance with the present invention. Performance monitoring method 10 begins at step 12, wherein the number of outputs that require monitoring is determined, and a unique audible sound is assigned to each of the outputs.

Method 10 continues at step 14 where the state of equilibrium (i.e., "normal" performance) of each of the outputs is determined. In a state of equilibrium, no audio is emitted. However, when a change is detected that is outside of an acceptable tolerance level, then an audible sound will be emitted indicating that there has been a change in performance. The audible sound may be emitted from one or more speakers coupled to the computer system on which the test program is being run.

For example, in a messaging application, the state of equilibrium may be the point after which the startup processing of the application has completed, the runtime processing has been warmed up (e.g. all Java just-in-time code compilation has completed), and the application has reached a point where an approximately constant throughput rate may be expected. The point at which the state of equilibrium is said to be reached may be configurable by the user. In one embodiment, the user may define the state of equilibrium to be the point at which the throughput rate has not varied by more than a certain percentage for a set period of time. In other words, when the throughput rate (or other output being monitored) has been within a set tolerance level for at least a specified period of time, the output is said to be within a state of equilibrium.

Next, each of the outputs is monitored in step 16 for a variation in the performance level from the equilibrium point or baseline, taking into account the tolerance level or variation factor set in step 14. If the program does not detect a significant variation in the performance level from the equilibrium point for any of the outputs, than the outputs may be continually monitored until the performance level of one or more of the outputs changes.

Once a variation exceeding the acceptable tolerance level or variation factor is detected in step 16, method 10 continues at step 18 where the audible sound associated with each output that falls outside the acceptable tolerance level is emitted. The amplitude of the audible sound may be adjusted according to the degree of change (from the state of equilibrium). Furthermore, the pitch or frequency of the audible sound may be varied to indicate whether the degree of change is positive or negative. For example, a high pitch (i.e., high frequency) audible sound may indicate a positive change in performance, and a low pitch (i.e., low frequency) audible sound may indicate a negative change in performance. The phase of the audible sound may also be varied in order to, for example, make it appear to the user that the sound is coming from any direction surrounding the user. This type of "two-dimensional" or "three-dimensional" sound may be achieved with as few as two speakers and utilizing existing technology that is known to those skilled in the art. Alternatively, any number of speakers may be coupled to the computer system running the application and positioned around the user at desired locations in order to physically produce two or three-dimensional audible sounds without having to rely on adjusting the phase of the sounds themselves in order to achieve the effect.

As will be understood by those skilled in the art, numerous other "factors" of the audible sound may be used to indicate changes in the performance of an application. Thus, the factors described above are presented merely for purposes of example and not limitation. However, it is important to note that the scale for each of the factors (i.e., audio amplitude, pitch, phase, frequency, etc.) must be sufficient such that the emitted audible sound exceeds the discernable threshold for each factor.

Finally, as illustrated by loop 20 of method 10, steps 16 and 18 may be repeated for the duration of the application testing or until the user intervenes. Thus, changes in output may be repeatedly monitored to enable the user to document performance levels over time.

One example of the benefits of using the system and method in accordance with the present invention may be illustrated as follows: The user desires to run a test in order to monitor memory usage and message throughput rate for a particular application. After the application has been started and has reached the state of equilibrium, the user begins to perform other tasks and does not visually monitor the performance of the outputs. However, after some period of time memory usage increases by a significant amount, which is indicated to the user by emitting a unique audible sound with a magnitude of plus 10 and a high pitch. At the same time the message throughput rate drops by a significant amount, which is also indicated to the user by emitting a different audible sound with a magnitude of plus 10 and a low pitch. Thus, as illustrated by the example, the system and method of the present invention make it much easier for the user to monitor the performance of an application as well as to make the association between the memory usage increasing and the throughput rate dropping.

As those skilled in the art will appreciate, the present invention may support a finite number of outputs that may be monitored. In particular, this maximum number may be determined based upon the maximum number of audible sounds that may be supported within the discernable audible range and still be distinctive. However, the number of outputs that will require monitoring is preferably well within this limit so that the user is not overwhelmed with an indiscernible "wall" of sound, and so that the user is not required to keep track of an unmanageable number of outputs.

One advantage of the system and method of the present invention compared to the completely "visual" systems and methods previously used is that the present invention does not require 100% cognitive focus. In particular, monitoring that is completely visual is inefficient when monitoring for a change in the state of the performance of an application over time. Being alerted to the change (and the degree of change) through audio is more efficient.

Another advantage of the inventive system and method described above is that it opens up performance monitoring to people who may otherwise be unable to perform such monitoring due to various disabilities or impairments. For example, people who have impaired vision or are blind generally are unable to monitor performance tests that rely on the visual display of information. However, providing output information in a manner that is not visual in nature opens the door to groups of individuals who would otherwise be unable to reliably perform such monitoring.

Although the present invention has been described with reference to preferred embodiments, workers skilled in the art will recognize that changes may be made in form and detail without departing from the spirit and scope of the invention.

What is claimed is:

1. A method for monitoring the performance of an application comprising:

determining an output of an application that requires monitoring, the output representing a performance metric associated with the application;

assigning an audible sound to the output, wherein the audible sound is comprised of a plurality of configurable parameters including amplitude, frequency, pitch, and phase;

running the application and allowing the application to reach a state of equilibrium;

determining a baseline for the output when the application is in the state of equilibrium, the baseline representing an output level that is substantially constant;

monitoring the output to detect a change relative to the baseline;

emitting the audible sound assigned to the output when the detected change varies from the baseline by a predetermined amount; and adjusting the configurable parameters of the audible sound to indicate the existence of the detected change, the magnitude of the detected change relative to the baseline, and the degree of deviation from the baseline, wherein the amplitude of the audible sound is adjusted to indicate the magnitude of the detected change from the baseline, and wherein the pitch of the audible sound is adjusted to indicate a positive change or a negative change from the baseline.

* * * * *